(12) United States Patent
Vattaneo et al.

(10) Patent No.: US 7,878,480 B2
(45) Date of Patent: Feb. 1, 2011

(54) SYSTEM AND METHOD FOR CONTROLLING A SOLENOID VALVE, PARTICULARLY FOR A SYSTEM FOR VARIABLE ACTUATION OF THE VALVES OF AN INTERNAL COMBUSTION ENGINE ACCORDING TO A MULTI-LIFT MODE

(75) Inventors: Francesco Vattaneo, Orbassano (IT); Luca Gentile, Orbassano (IT); Claudio Lanfranco, Orbassano (IT)

(73) Assignee: C.R.F. Società Consortile per Azioni, Orbassano (Turin) (IT)

( * ) Notice: Subject to any disclaimer, the term of this patent is extended or adjusted under 35 U.S.C. 154(b) by 549 days.

(21) Appl. No.: 12/078,391

(22) Filed: Mar. 31, 2008

(65) Prior Publication Data
US 2009/0020715 A1    Jan. 22, 2009

(30) Foreign Application Priority Data
Jul. 20, 2007    (EP)    ................................. 07425445

(51) Int. Cl.
*F16K 31/02*    (2006.01)
(52) U.S. Cl. .................................... 251/129.02; 251/77
(58) Field of Classification Search .................. 251/77, 251/129.01, 129.02, 129.15
See application file for complete search history.

(56) References Cited

U.S. PATENT DOCUMENTS 3,829,060 A    8/1974    von Lewis

| | | | | |
|---|---|---|---|---|
| 5,167,442 A * | 12/1992 | Alaze et al. | ............... | 303/113.2 |
| 5,725,289 A * | 3/1998 | Mueller et al. | ........... | 303/119.2 |
| 6,453,930 B1 * | 9/2002 | Linkner et al. | ........... | 137/15.18 |
| 6,655,328 B2 * | 12/2003 | Kather | .................... | 123/90.11 |

FOREIGN PATENT DOCUMENTS

| | | |
|---|---|---|
| DE | 2 208 183 | 8/1973 |
| DE | 102 35 196 A1 | 2/2004 |
| DE | 10 2006 043 677 A1 | 6/2007 |
| EP | 0 803 642 A1 | 10/1997 |
| EP | 1 726 790 A1 | 11/2006 |

OTHER PUBLICATIONS

European Search Report for EP 07 42 5445 completed Dec. 21, 2007.

* cited by examiner

*Primary Examiner*—John K Fristoe, Jr.
(74) *Attorney, Agent, or Firm*—Nixon & Vanderhye P.C.

(57) ABSTRACT

A solenoid valve, particularly of the type to be used for controlling a hydraulic system for variable actuation of the valves of an internal-combustion engine, has a valve element co-operating with a valve seat and a pusher element, separate from the valve element, which is pushed against the valve element by the movable core of the solenoid valve when the solenoid of the solenoid valve is energized in order to bring the valve element into contact with the valve seat. After de-energization of the solenoid, the time necessary for bringing back the pusher element into the resting condition in contact with the valve element is reduced thanks to the application of a braking current to the solenoid of the solenoid valve during the stage in which the movable core and the pusher element associated thereto displace in the direction opposite to the direction of the movement generated by the magnetic field of the solenoid, following upon de-energization of the solenoid valve.

9 Claims, 8 Drawing Sheets

SYSTEM AND METHOD FOR CONTROLLING A SOLENOID VALVE, PARTICULARLY FOR A SYSTEM FOR VARIABLE ACTUATION OF THE VALVES OF AN INTERNAL COMBUSTION ENGINE ACCORDING TO A MULTI-LIFT MODE

BACKGROUND OF THE INVENTION

The present invention relates in general to the field of methods for controlling a solenoid valve and regards in particular a method for controlling a solenoid valve that can be used in a system for variable actuation of the valves of an internal-combustion engine according to a multi-lift mode.

A system for variable actuation of the valves of an internal-combustion engine according to a multi-lift mode has formed the subject of European patent application EP 1 726 790 A1 filed in the name of the present applicant. The system disclosed in this document relates to an internal-combustion engine of the type comprising at least one cylinder and at least one intake valve and one exhaust valve associated to the cylinder, and actuated so as to control the flow of gas through the respective intake and exhaust pipes, in which at least one engine valve is controlled by electronically controlled variable-actuation means, designed to impart on the valve different opening and closing times and different lift profiles, as the conditions of operation of the engine vary.

In recent years an ever-increasing number of studies and experiments has been developed in the field of engines of the type specified above. The present applicant is the owner of a large number of patents and patent applications regarding a system for variable actuation of the valves, in which each variable-actuation valve is controlled by the respective cam by means of a tappet and corresponding hydraulic means, which include a pressurized-fluid chamber, for hydraulic transmission of the movement of the tappet to the engine valve. The aforesaid pressurized-fluid chamber can be connected by means of an electronically controlled solenoid valve to an exhaust channel, so that the transmission between the cam and the engine valve is interrupted and the engine valve closes as a result of the respective biassing spring means. The solenoid valves that control communication of the pressurized-fluid chambers associated to the various engine valves with the aforesaid exhaust channel are electronically controlled according to different possible strategies, as the conditions of operation of the engine vary, to obtain advantages in terms of performance and/or efficiency of operation of the engine and/or reduction of the consumption of the fuel and/or reduction of the noxious exhaust emissions.

The system forming the subject of EP 1 726. 790 A1 envisages control of the intake valves of the engine, preferably with the aid of an electro-hydraulic system of the type specified above, to impart on each intake valve, in predetermined conditions of operation of the engine, a plurality of successive cycles of movements of opening and closing within what would be the single conventional cycle of opening and closing of the engine valve.

In the specific case in which this operating mode is implemented with the aid of an electro-hydraulic system of the type described above, there arises a problem due to the fact that each of the solenoid valves used in this system is of the normally open type, in which a valve element can be driven to the closed condition by means of a pusher element which is rigidly connected to the movable core associated to the solenoid of the solenoid valve, this pusher element being separate, instead, from the body of the valve element. As will emerge more clearly from the detailed description of the solenoid valve that will be provided hereinafter, this results in that, when the solenoid valve is de-energized, following upon a closing thereof, the valve element returns to its starting end position, whilst the pusher element continues its return stroke, detaching from the body of the valve element and then takes time to return again into contact with the valve element, as a result of the action of a respective return spring. This structure of the solenoid valve thus sets a minimum limit to the time that must elapse between two successive energizations of the solenoid valve in so far as, for the purposes of proper operation and long duration of the solenoid valve, it is necessary for each new energization of the solenoid valve to occur after the pusher element has returned to its resting position, in contact with the valve element, following upon the preceding de-energization. For example, in the specific case of a solenoid valve used by the present applicant, the aforesaid minimum time that must elapse between two successive energizations of the solenoid valve is 2.5 ms. This represents a limit with respect to the possibility of an optimal exploitation of the system for variable actuation of the engine valves in so far as in the multi-lift actuation mode there may occur, in certain conditions of operation of the engine, the need to control a second subcycle of opening of the engine valve after the end of the preceding subcycle without waiting for the aforesaid minimum waiting time to elapse.

SUMMARY OF THE INVENTION

The purpose of the present invention is to solve the aforesaid problem.

With a view to achieving said purpose, the subject of the invention is a system and a method for controlling a solenoid valve, which have the characteristics specified in the annexed claims 1 and 4.

The invention is moreover preferably aimed at application of said method to a system for variable actuation of the valves of an internal-combustion engine, according to what is specified in the annexed claim 7.

Thanks to said characteristics, the invention in particular enables solution of the problem of actuation of the engine valves in multi-lift mode, without prejudice to proper operation and long service life of the solenoid valves of the system for variable actuation of the engine. Energization of the solenoid of the solenoid valve during the stage in which the movable core of the solenoid valve moves in the direction opposite to the one generated by the solenoid, and only during said stage, causes the movement in said direction of the movable core of the solenoid to be braked, with the consequence that the time that the movable core with the pusher element associated thereto takes to return to its resting position, with the pusher element in contact with the valve element of the solenoid valve, is reduced. There is consequently also a reduction in the minimum time that must elapse between two successive activations of the solenoid valve, a fact that enables adoption of strategies for control of the engine valves that envisage cycles of the multi-lift type with repeated cycles of opening and closing of the engine valves within what would be the single traditional cycle of opening and closing of the valves, with a time between complete closing of a valve at the end of a first "subcycle" and re-opening of the same valve at the start of a subsequent "subcycle" that is also very reduced.

BRIEF DESCRIPTION OF THE DRAWINGS

Further characteristics and advantages of the invention will emerge from the ensuing description with reference to the annexed plates of drawings, which are provided purely by way of non-limiting example and in which.

DETAILED DESCRIPTION OF THE INVENTION

Figure 1:
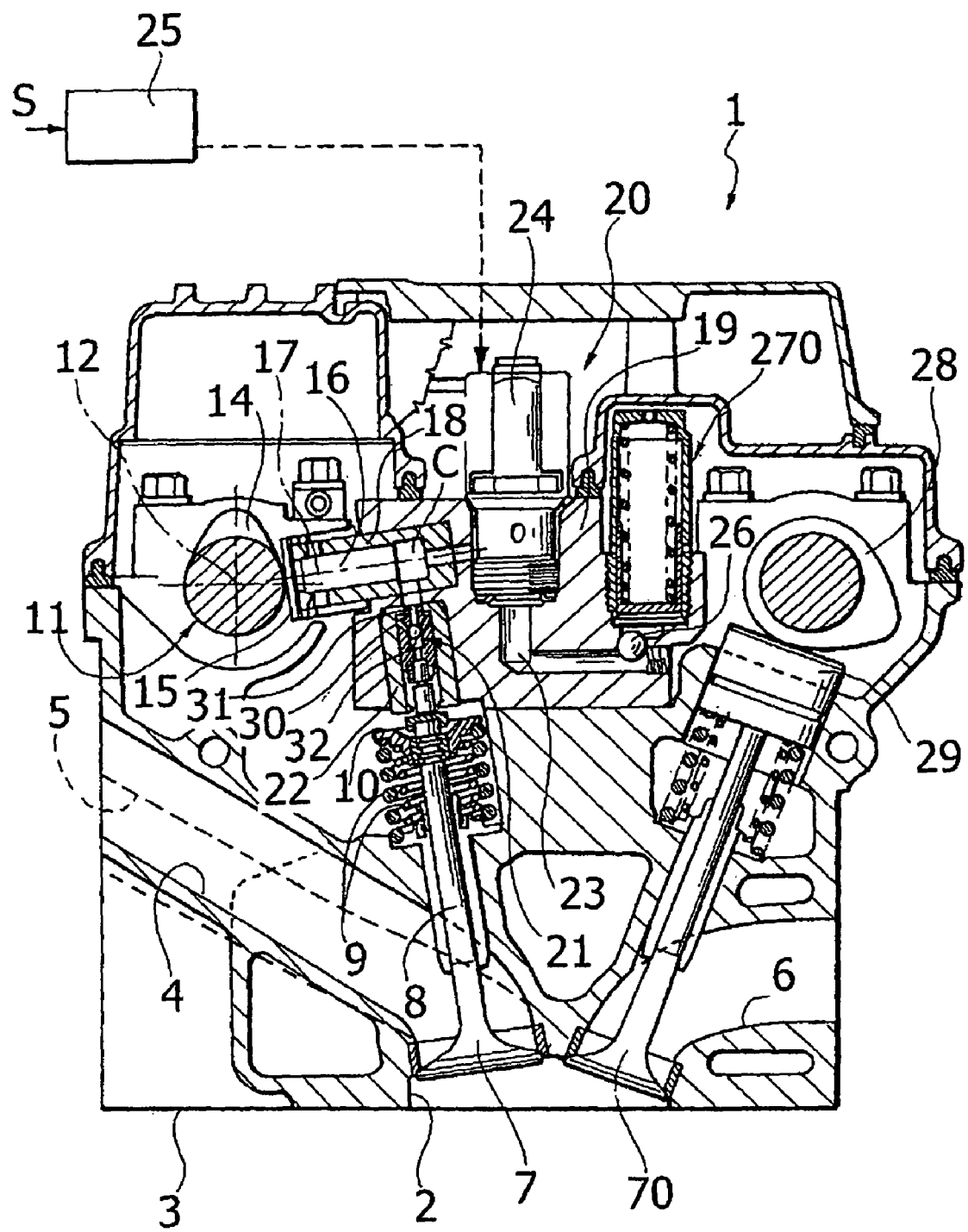
FIG. 1 is a cross-sectional view of an internal-combustion engine according to the known art, of the type described, for example, in the European patent No. EP 0 803 642 B1, filed in the name of the present applicant, which is presented herein to provide an example of a system for variable actuation of the valves to which the invention is applicable.

FIG. 1 shows an internal-combustion engine of the type described in the preceding European patent application No. EO-A-0 803 642 filed in the name of the present applicant, which is a multicylinder engine, for example an engine with four cylinders set in line, comprising a cylinder head 1. The cylinder head 1 comprises, for each cylinder, a cavity 2 formed in the base surface 3 of the cylinder head 1, defining the combustion chamber, into which two intake pipes 4, 5 and two exhaust pipes 6, controlled by two intake valves 7 and two exhaust valves 70 give out. Once again in the case of the example illustrated, the intake valves 7 are controlled by the cams 14 of a camshaft 11 via a hydraulic system. The hydraulic system of actuation of each valve includes a hydraulic chamber, which is controlled by a normally open solenoid valve 24, controlled by a programmable electronic control unit 25. When the solenoid valve 24 is activated, the engine valve follows the movement of the cam (full lift). Anticipated closing of the valve can be obtained by deactivating (opening) the solenoid valve 24 so as to empty the hydraulic chamber and to obtain closing of the engine valve under the action of the respective return springs. Likewise, delayed opening of the valve can be obtained by retarding activation of the solenoid valve, whilst the combination of delayed opening with an anticipated closing of the valve can be obtained with activation and deactivation of the solenoid valve during the thrust of the corresponding cam.

Figure 4:
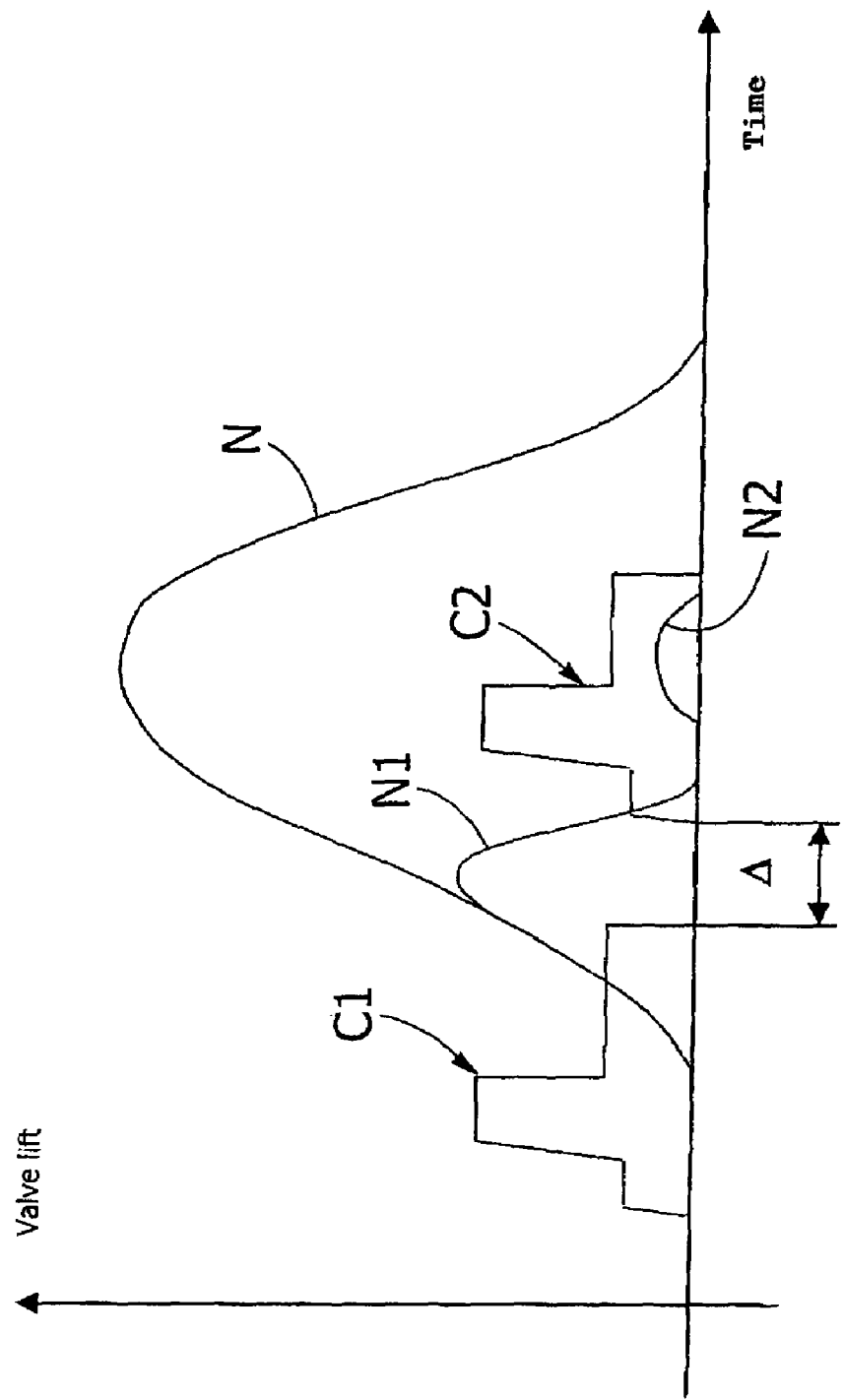
FIG. 4 is a diagram illustrating the strategy for controlling an engine valve according to the multi-lift mode, which can be obtained with the system according to the invention, compared to a traditional cycle of opening and closing of the valve.

The diagram of FIG. 4 designates by N the conventional lifting of an intake valve of the engine in the course of the rotation of the crankshaft, during each cycle of operation of the engine. Said diagram is uniquely determined by the geometry of the cam that controls the valve. According to an alternative strategy, in accordance with the teachings of the patent application No. EP 1 726 790 A1 filed in the name of the present applicant, each intake valve can be controlled in multi-lift mode, i.e., according to two or more repeated "subcycles" of opening and closing of the type designated by N1 and N2 in the annexed FIG. 4. In each subcycle, the intake valve opens and then closes completely. After the first subcycle N1, and a further rotation of the crankshaft, the valve is controlled with a second subcycle N2. In FIG. 4, the lines C1 and C2 indicate the profile of the electric current supplied to the solenoid valve for the purpose of closing each time communication between the corresponding pressurized chamber and the exhaust channel so as to enable valve lift. Each of said profiles has a first level of activation followed by a higher level, necessary for pushing the movable core of the solenoid valve against the valve seat, which is in turn followed by a lower level, necessary for keeping the solenoid valve in the aforesaid closing condition.

Figure 2:
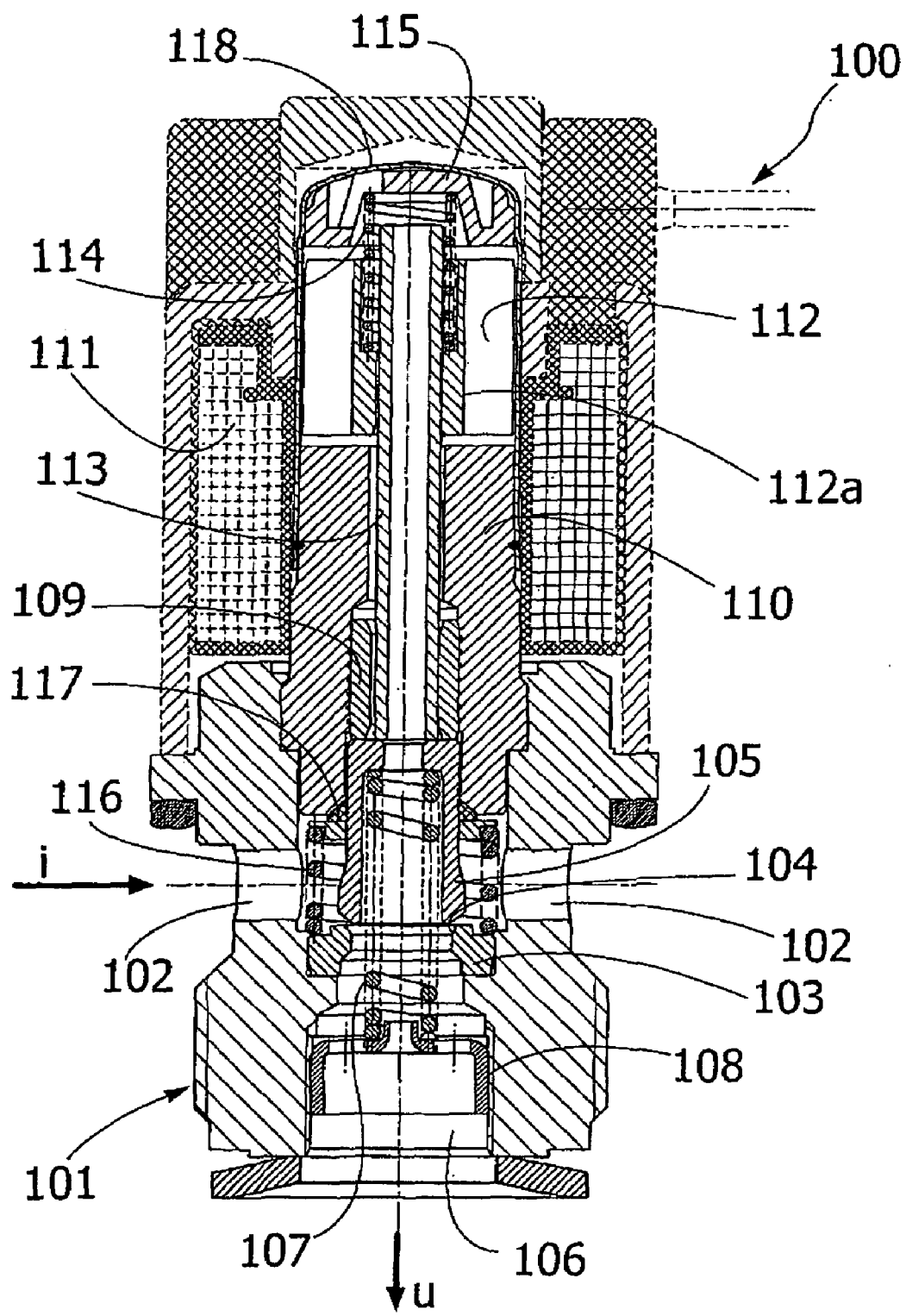
FIG. 2 is a cross-sectional view of an example of embodiment of a solenoid valve that can be used in the system of FIG. 1.
Figure 3:
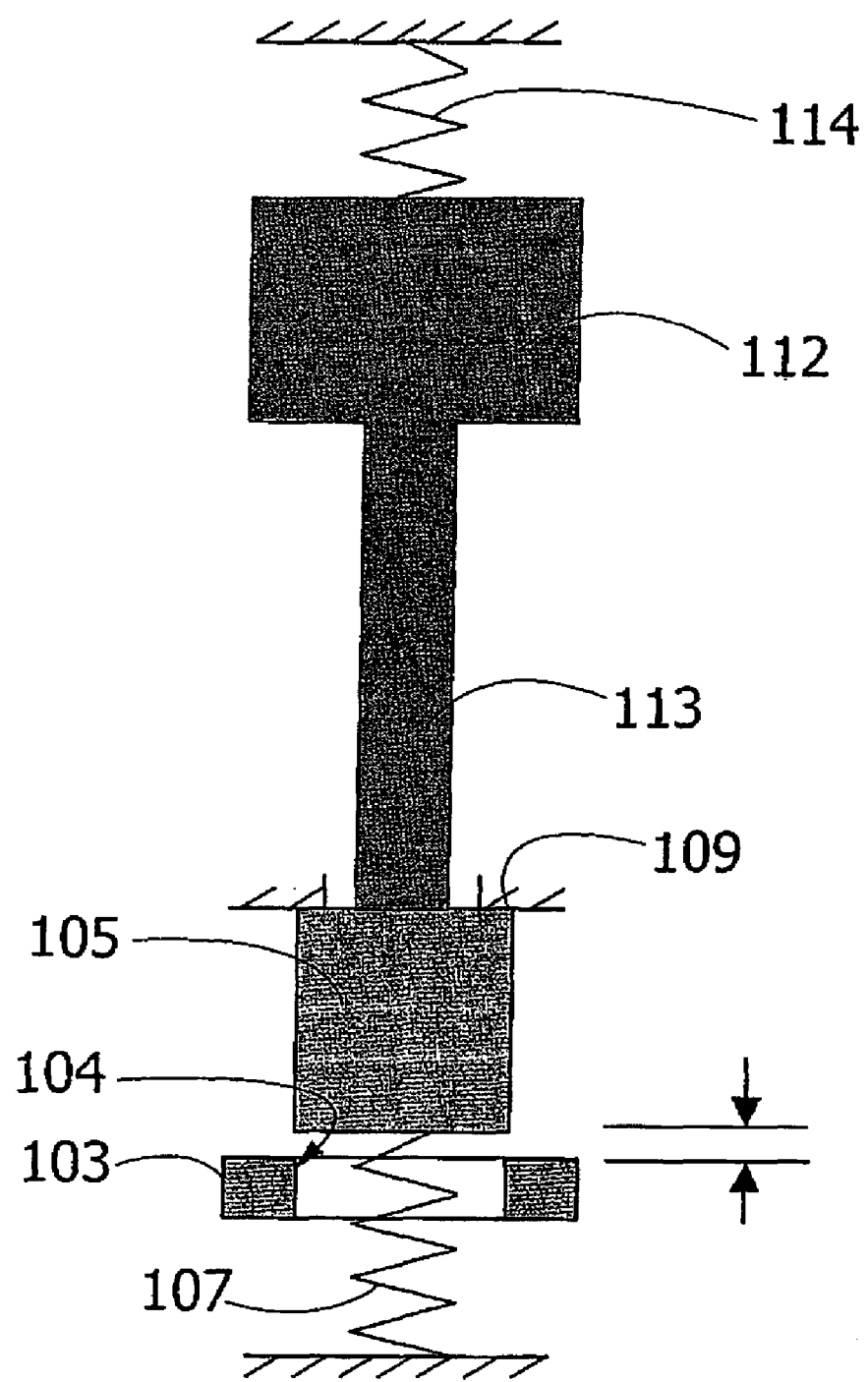
FIG. 3 is a schematic representation of the solenoid valve of FIG. 2.

FIGS. 2 and 3 of the annexed plates of drawings illustrate an embodiment and a schematic simplification of the solenoid valve used in the system according to the invention. Said embodiment is herein illustrated purely by way of example, since the structure and conformation of the solenoid valve could be different.

With reference to FIG. 2, the solenoid valve, designated as a whole by the reference number 100, comprises a body 101 of a substantially tubular shape with four radial passages 102 (two of which are visible in the figures) giving out into the internal cavity of the tubular body 101. Mounted within said cavity is a ring 103 defining with an end edge thereof a valve seat 104 for a valve element 105 designed to control communication between the four passages 102 that communicate in turn with the inlet i (which in turn is in communication with the pressurized-fluid chamber of the system for actuation of the engine valve) and the outlet end 106 of the internal cavity of the body 101, constituting the outlet u communicating with the exhaust channel. The valve element 105 has a tubular body that is normally kept in a raised end position (illustrated in FIG. 2), corresponding to the open condition between the inlet i and the outlet u by a helical spring 107, set between the valve element 105, and a supporting disk 108, fixed to the body of the valve. In the aforesaid raised end position, the valve element bears upon the end of a bushing 109, which is in turn locked in a fixed position within a tubular body 110, which is in turn fixed within the top end of the cavity of the bushing 101. The tubular body 110 has a portion projecting axially from the tubular body 101, around which the solenoid 111 of the solenoid valve is mounted. The solenoid controls the movement of a movable core 112 having a substantially cylindrical body with four axial grooves 112a (just two of which are visible in the drawing). Connected to the movable core 112 is a pusher element 113 in the form of a tubular rod that is set through the tubular body 110 and through the bushing 109 and has a bottom end that is normally kept in contact with the valve element 105 by a helical spring 114, which is axially set between the movable core 112 and a lid 115 fixed to the cap 118 (fixed to the tubular body 110), around which the coil 111 is fitted. The structure described above is exemplified in FIG. 3, where the spring 107 is seen to keep the valve normally open, pushing the valve element 105 so that it bears upon the end of the bushing 109, in its raised end position, in which the valve element 105 is set at a distance H from the valve seat 104. At the same time, the spring 114 normally keeps the movable core 112 with the pusher element 113 associated thereto in the position of contact of the pusher element 113 with the valve element 105. In said condition, as may be seen in FIG. 2, the movable core 112 and the tubular body 110 have ends facing one another at a slight distance apart. Energization of the solenoid 111 causes lowering of the movable core 112, against the action of the spring 107, up to contact of the valve element 105 with the valve seat 104 and consequent closing of the communication between the inlet i and the outlet u. Said movement is allowed by the space existing, in the condition of rest, between the facing surfaces of the movable core 112 and the tubular body 110. Once again with reference to FIG. 2, a spring 116 is set between the ring 103 defining the valve seat, which is fixed to the tubular body 101, and a seal ring 107, which is set around the valve element 105 and is kept against the bottom end surface of the tubular body 110, which is also fixed. Consequently, the spring 116 does not have any effect on the movement of the valve element 105 or of the movable core 112.

In the known systems that use a solenoid valve of the type illustrated in FIGS. 2, 3, the activation of the solenoid 111, as already indicated above, causes lowering of the movable core 112, with consequent lowering of the pusher element 113, which pushes the valve element 105 into its lowered end position, in contact with the valve seat 104, in which the communication between the inlet i and the outlet u of the solenoid valve is interrupted. When the solenoid 111 is de-energized for re-opening the communication between the inlet i and the outlet u, the valve element is pushed upwards by the spring 107, net of the thrust exerted by the spring 114, which has a smaller load, up to its raised end position in contact with the bushing 109. After the valve element has reached said raised end position, the movable core 112 and the pusher element 113, since they are not connected rigidly to the valve element 105, proceed by inertia their progress upwards, countered by the action of the spring 114 alone. After a certain lapse of time, said spring 114 then brings the movable core 112 and the pusher element 113 back into the position in contact with the valve element 105.

Figure 5:
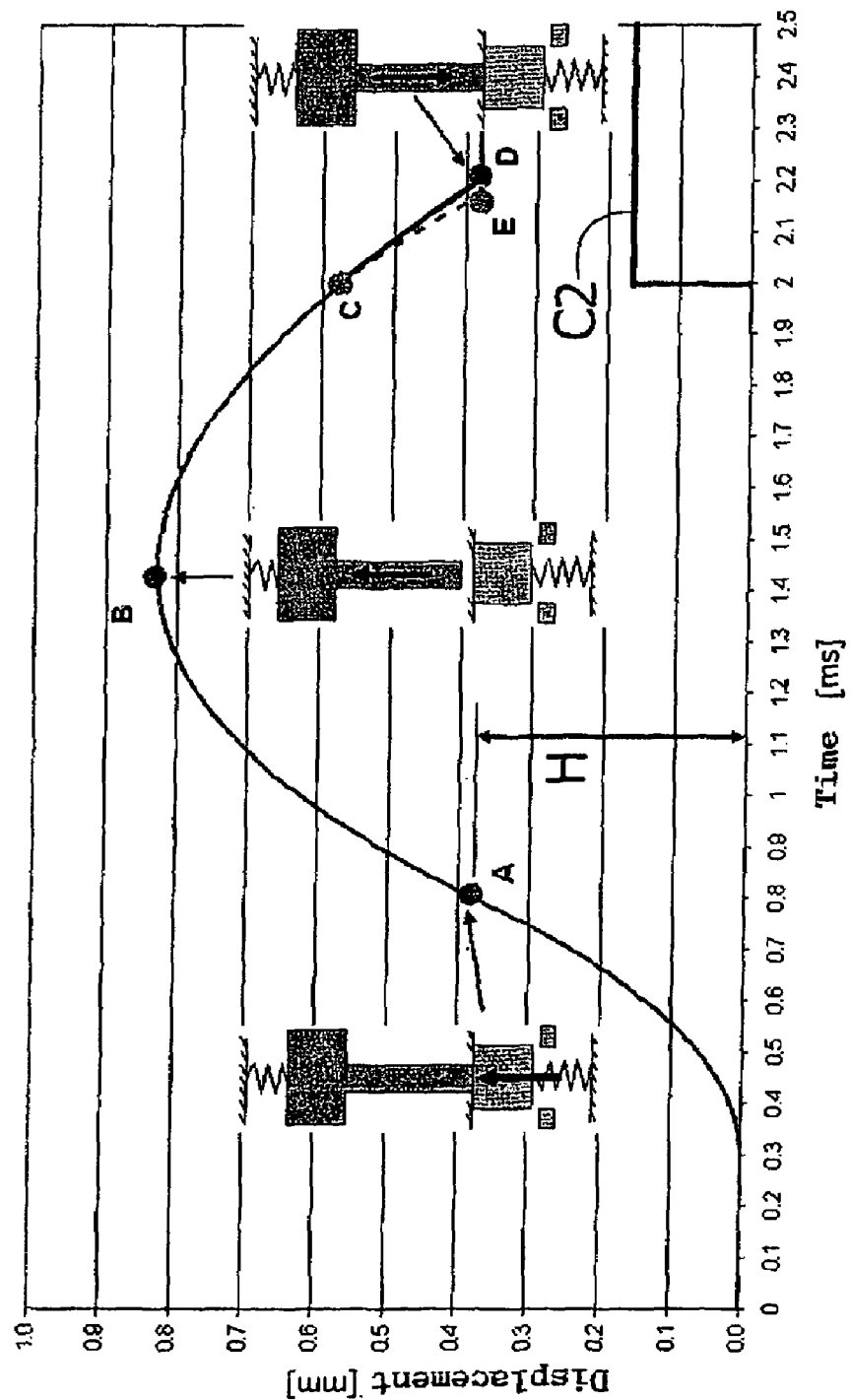
FIGS. 5, 6 are diagrams illustrating the displacement of the movable core of the solenoid valve and the variation in speed of the movable core of the solenoid valve that can be obtained with the known system.
Figure 6:
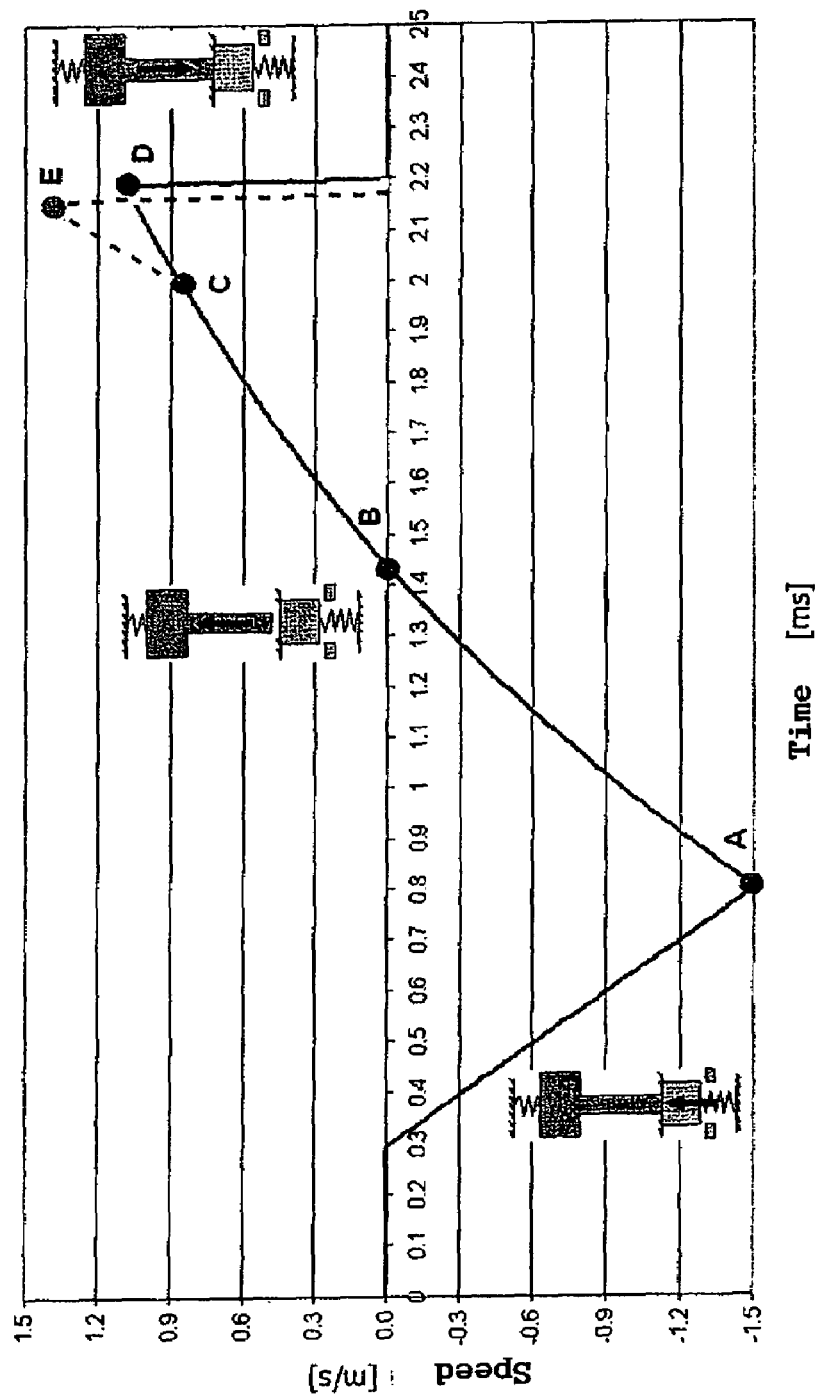

FIGS. 5 and 6 show the time plots of the displacement of the movable core and of the variation of speed of the movable core, following upon de-energization of the solenoid valve (the position with zero displacement corresponds to the lowered end position of the valve element, in contact with the valve seat).

In the case of a system for variable actuation of the valves of an internal-combustion engine of the type that has been indicated above, in which each intake valve is governed, in certain conditions of load and r.p.m., according to the mode with two "subcycles" of opening and closing N1, N2 of the type illustrated in FIG. 4, it may prove useful, for optimization of the combustion and hence of the levels of fuel consumption, for the two subcycles N1 and N2 to be very close to one another, to the point where the second activation of the solenoid valve (signal C2 in FIG. 4) occurs when the motion of the movable core 112 and of the pusher element 113 of the solenoid valve has not yet terminated following upon the preceding deactivation of the solenoid valve.

FIGS. 5, 6 show with a dashed line how the diagrams of the displacement of the movable core and of the variation in speed of the movable core are modified in the case where the solenoid valve is again energized before the pusher element has returned into contact with the valve element following upon the preceding deactivation of the solenoid valve. In the specific case, it is illustrated how the supply of current to the solenoid (profile C2 in FIG. 5) is resumed after just 2 ms following upon the preceding deactivation. The diagrams show how in this case the energy of impact of the pusher element increases by approximately 50% with respect to the normal condition (transition from point D to point E in the diagram of FIG. 6), on account of the acceleration of the motion caused by the magnetic force. This causes an increase in the wear of the solenoid valve and a potential uncontrollability of the subsequent instant of closing of the solenoid valve.

There consequently exists in known systems a limitation to the possibility of reducing the time Δ (see FIG. 4) that elapses between two successive energizations of the solenoid valve.

In order to solve said problem, according to the invention there is envisaged application of a "braking" current, following upon a deactivation of the solenoid valve, during the movement of the movable core 112 and of the pusher element 113 in the direction opposite to the one caused by the solenoid 111 (i.e., during the movement upwards of the movable core 112, as viewed in FIGS. 2 and 3), and only in the course of said movement, i.e., not beyond the instant starting from which the movable core 112 and the pusher element 113 start again to displace in the direction of the valve element 105. This is represented schematically in the diagram of FIG. 7, which shows how a pulse CF of current is supplied following upon deactivation of the solenoid valve (which occurs, with reference to the diagram of FIG. 7, at the instant 0) for a duration of time that in any case does not extend beyond the instant of reversal of the movement of the movable core. By so doing, the magnetic force comes to be added to the force of the spring 114, so that the movable core 112 with the associated element 113 are braked in the stage of their progress upwards and take less time to return into the resting condition in which the pusher element 113 is in contact with the valve element 105. This emerges clearly from FIG. 7, which shows with a dashed line the diagram of the displacement of the movable core in the known system, and with a solid line the variation of displacement in the case of the system according to the invention. As may be seen, the intervention of the braking current CF causes a reduction in the time necessary for bringing the pusher element back into contact with the valve element. As has already been said, it is important that the braking current pulse should not protract into the stage in which the movable core and the pusher element are already moving in the direction of the valve element in so far as, in this case, there would again be the effect of a greater final speed of impact of the pusher element against the valve element. The diagram of FIG. 8 illustrates the advantages of the present invention. Thanks to the reduction in the final speed of impact of the pusher element against the valve element, the energy of impact is reduced by approximately 40% with respect to the conventional situation (illustrated by the diagram with a dashed line).

The advantage of the use of the braking current is thus that of enabling reduction in the time that elapses between two successive activations of the solenoid valve, without adversely affecting the duration of the internal components of the solenoid valve. Furthermore, the braking current can be used also in other conditions of operation of the engine to reduce the wear and damage to the components of the solenoid valve. In other words, it may be convenient to use the braking current also in the case where there is no need to activate and reactivate the solenoid valve with cycles following one another very closely.

It should moreover be pointed out that the braking current is in any case preferably activated not before the valve element 105 has returned into its raised end position (FIGS. 2 and 3, and point A in FIG. 7) so as not to increase the time necessary for bringing the valve element into its resting position, corresponding to the open condition of the solenoid valve.

Of course, without prejudice to the principle of the invention, the details of construction and the embodiments may vary widely with respect to what is described and illustrated herein purely by way of example, without thereby departing from the scope of the present invention.

Figure 7:
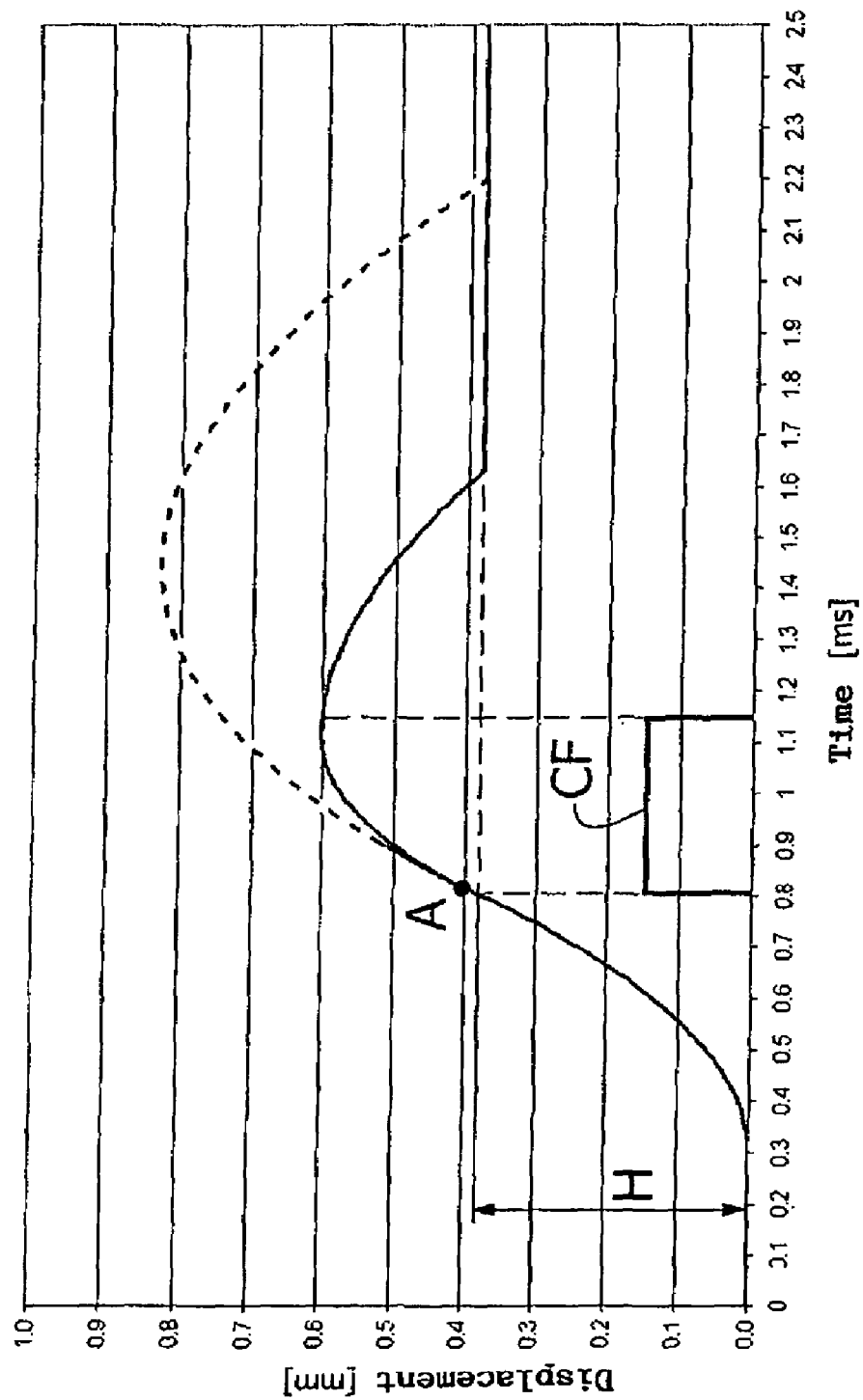
FIGS. 7, 8 are diagrams illustrating the displacement of the movable core of the solenoid valve and the variation in speed of the movable core of the solenoid valve that can be obtained with the method according to the present invention.
Figure 8:
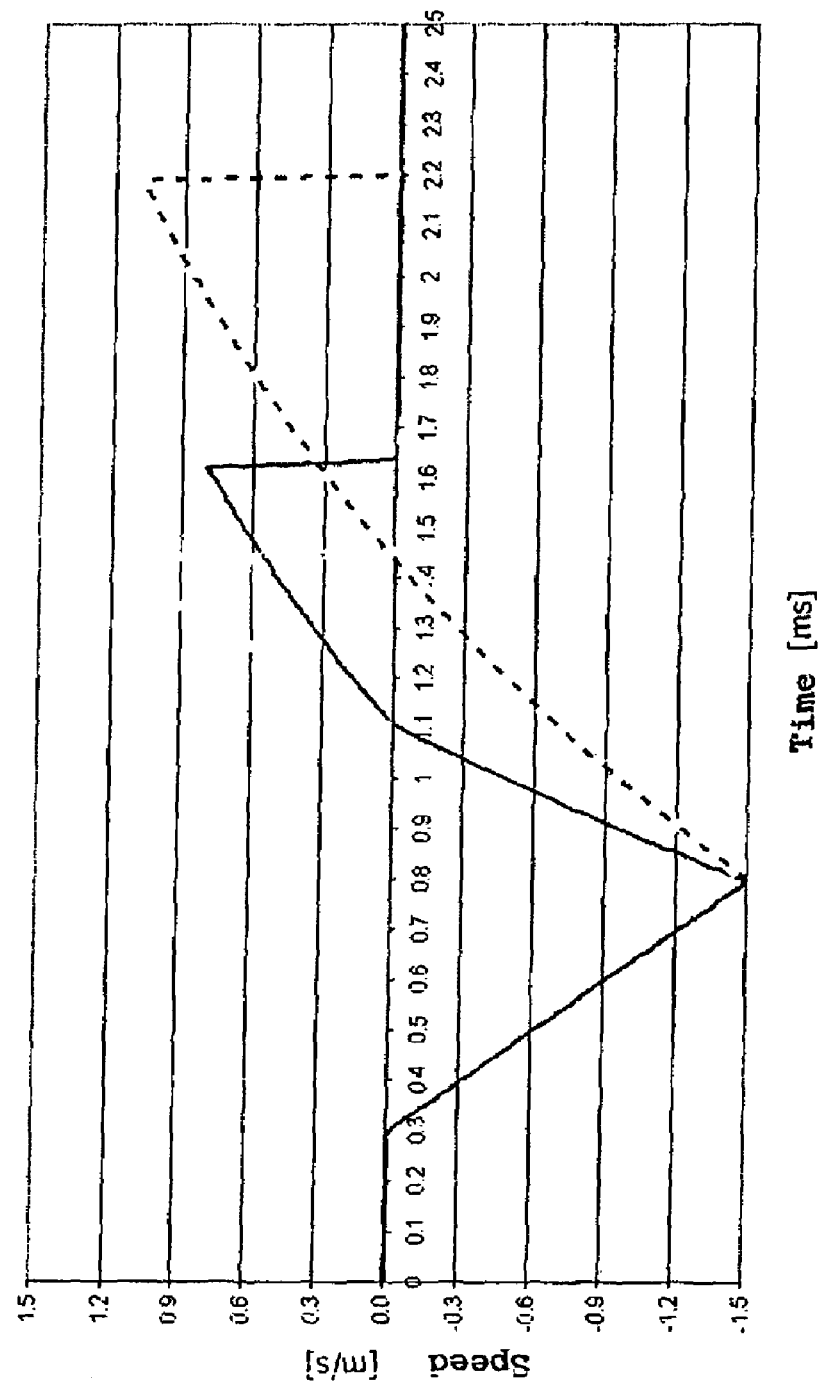

With reference to FIG. 7, it is to be noted in particular that it illustrates an ideal case, in which the braking current CF starts exactly at the instant when the valve element returns into its raised end position and terminates exactly at the instant when the movable core starts to move downwards again. In actual fact, the initial instant of the supply of the braking current could precede the instant in which the valve element returns into its raised end position, in order to make sure that the magnetic braking force will have already reached a predetermined value when the valve element reaches said position. In the same way, the braking current could in any case protract also after reversal of the motion of the movable core, even though this is not the preferred solution. The only essential condition is that the braking current should start following upon de-energization of the solenoid 111, which causes passage of the solenoid valve from its closed condition to its open condition, and should terminate before another energization of the solenoid, which causes passage of the solenoid valve from its open condition to its closed condition.

As regards the value of the braking current, this is chosen according to the specific characteristics of the solenoid valve, it being understood that the higher said value is, the more effective the braking, with consequent reduction in the time of "flight" of the pusher and of the final speed of impact of the pusher against the valve element.

What is claimed is:

1. A system for controlling a solenoid valve, in which the solenoid valve comprises:

a valve seat;

a valve element normally kept by first spring means in a condition set at a distance from the valve seat, corresponding to an open condition of the solenoid valve, against a stop element;

a solenoid, which can be activated for pushing a movable core and a pusher element associated thereto against said valve element in order to bring it, against the action of said first spring means, into a condition of contact with said valve seat, corresponding to a closed condition of the solenoid valve; and second spring means for normally holding the movable core and the pusher element associated thereto in the position corresponding to contact of the pusher element with said valve element; and in which said system further comprises electronic means for controlling supply of said solenoid, said system being characterized in that said electronic means are programmed for supplying a braking current to the solenoid following upon de-energization of the solenoid, which causes passage of the solenoid valve from its closed condition to its open condition, and for interrupting said braking current before another energization of the solenoid, which causes passage of the solenoid valve from its open condition to its closed condition, in order to brake the movement of the movable core and of the pusher element following upon said de-energization so as to reduce the time required for bringing the pusher element back into contact with the valve element after said de-energization.

2. The system for controlling a solenoid valve according to claim 1, wherein the aforesaid electronic control means are programmed so that said braking current is supplied only in a stage in which the movable core and the pusher element associated thereto displace in the direction opposite to the one determined by the solenoid, and not beyond the end of said stage.

3. The system for controlling a solenoid valve according to claim 2, wherein the aforesaid electronic control means are programmed so that the aforesaid braking current is supplied starting from an instant substantially not preceding the instant in which the valve element returns into its resting position, following upon the preceding de-energization of the solenoid valve.

4. A method for controlling a solenoid valve, in which said solenoid valve comprises:

a valve seat;

a valve element normally kept by first spring means in a condition set at a distance from the valve seat, corresponding to an open condition of the solenoid valve, against a stop element;

a solenoid, which can be activated for pushing a movable core and a pusher element associated thereto against said valve element in order to bring it, against the action of said first spring means, into a condition of contact with said valve seat, corresponding to a closed condition of the solenoid valve; and second spring means for normally holding the movable core and the pusher element associated thereto in the position corresponding to the contact of the pusher element with said valve element, said method being characterized in that a braking current is supplied to the solenoid following upon de-energization of the solenoid, which causes passage of the solenoid valve from its closed condition to its open condition, and said braking current is interrupted before another energization of the solenoid, which causes passage of the solenoid valve from its open condition to its closed condition, in order to brake the movement of the movable core and the pusher element following upon said de-energization, so as to reduce the time required for bringing the pusher element back into contact with the valve element after said de-energization.

5. The method according to claim 4, wherein said braking current is supplied only in a stage in which the movable core and the pusher element associated thereto displace in the direction opposite to the one determined by the solenoid, and not beyond the end of said stage.

6. The method according to claim 5, wherein the aforesaid braking current is supplied starting from an instant substantially not preceding the instant in which the valve element returns into its resting position, following upon the preceding de-energization of the solenoid valve.

7. The method of control according to claim 4, wherein said solenoid valve is used in a system for variable actuation of the valves of an internal-combustion engine, in which at least one intake engine valve is controlled by a respective cam by means of a hydraulic system including a pressurized chamber that can be connected with an exhaust channel by means of the aforesaid solenoid valve, so that when said solenoid valve is in the closed condition, the pressurized chamber is able to transmit the movements of the cam to the engine valve, whilst, when the solenoid valve is in the open condition, the engine valve is uncoupled from the respective cam and consequently remains in its closed condition.

8. The method according to claim 7, wherein said solenoid valve is energized and de-energized repeatedly within what would be the conventional cycle of opening and closing of an engine valve, for the purpose of opening and closing the intake valve a number of times in the angular range of rotation of the crankshaft corresponding to the traditional cycle of opening and closing of the engine valve and in that between two successive subcycles of opening and closing of the engine valve said solenoid valve is supplied with said braking current for the purpose of reducing the waiting time necessary between two successive cycles of activation and deactivation of the solenoid valve in order to bring the pusher element of the solenoid valve rapidly back into the resting condition in contact with the valve element, following upon de-energization of the solenoid valve, so as to be able to energize the solenoid valve again to cause a new subcycle of opening and closing of the engine valve.

9. The method according to claim 8, wherein the time that the pusher element takes to return into its resting position in contact with the valve element following upon de-energization of the solenoid valve is less than 2.5 ms.

* * * * *